United States Patent [19]

Laney

[11] Patent Number: 5,194,091

[45] Date of Patent: Mar. 16, 1993

[54] GEOPOLYMER-MODIFIED, GYPSUM-BASED CONSTRUCTION MATERIALS

[75] Inventor: Bill E. Laney, Albuquerque, N. Mex.

[73] Assignee: The Hera Corporation, Albuquerque, N. Mex.

[21] Appl. No.: 635,735

[22] Filed: Dec. 26, 1990

[51] Int. Cl.$^5$ .................... C04B 11/28; C04B 12/04
[52] U.S. Cl. .................... 106/611; 106/614; 106/615; 106/616; 106/618; 106/628; 106/772; 106/778; 106/779; 106/780; 106/782; 156/39
[58] Field of Search .............. 106/609, 611, 614, 615, 106/616, 618, 628, 772, 778, 780, 782, 779; 156/39

[56] References Cited

U.S. PATENT DOCUMENTS

| | | | |
|---|---|---|---|
| 2,531,496 | 11/1950 | Bean et al. | 106/611 |
| 3,853,571 | 12/1974 | Gelbman | 106/611 |
| 4,151,000 | 4/1979 | Bachelard et al. | 106/611 |
| 4,482,379 | 11/1984 | Dibrell et al. | 106/611 |

*Primary Examiner*—William R. Dixon, Jr.
*Assistant Examiner*—Anthony J. Green
*Attorney, Agent, or Firm*—Samuel M. Freund

[57] ABSTRACT

Geopolymer-modified gypsum construction materials. Compositions derived from combining geopolymer adhesives with conventional gypsum wallboard slurry formulations produce an interpenetrating network (IPN) which cures by loss of process water to a refractory solid having improved fire and water resistance. Geopolymer adhesive starting compositions includes soluble and insoluble silicates, buffers and salts, and a chemical setting agent in aqueous suspension.

24 Claims, 2 Drawing Sheets

GEOPOLYMER-MODIFIED, GYPSUM-BASED CONSTRUCTION MATERIALS

BACKGROUND OF THE INVENTION

The present invention relates generally to gypsum wallboard construction material, and more particularly to the modification of such materials by the addition of silica-based geopolymer adhesives to produce composites which exhibit improved fire performance, water resistance, and structural properties.

Gypsum wallboard is a widely used construction material because of its low cost and fire resistance. Fire resistance capability is generally proportional to the thickness of the gypsum employed in a fire resisting structure. For example, a simple structure approved for a fire endurance period of one hour uses a ⅝ in. thick slab of Type X gypsum wallboard on either side of a 3⅝ in. metal stud with an air filled cavity for a non-load-bearing wall assembly. Other designs provide fire resistance for periods of up to two hours.

Gypsum is a naturally occurring form of the dihydrate of calcium sulfate. This material can be readily transformed to its stucco form, the hemi-hydrate of calcium sulfate, by one of several calcination processes. Gypsum provides fire protection through two primary mechanisms: the non-combustible nature of inorganic compounds; and the endothermic, energy-absorbing capacity of the dihydrate which produces steam when exposed to intense heat. In equation form, gypsum→ Plaster of Paris+Steam−Energy, or $CaSO_4(2H_2O) \rightarrow CaSO_4 (0.5H_2O) + 1.5H_2O - 4100$ cal/mole.

A wall which is to endure fire for a period of at least one hour must be able to withstand temperatures well in excess of 1500° F. This temperature is considerably in excess of the ignition temperature of most organic materials (about 450°–800° F.). Thus, a fire-resistant wall must maintain the temperature of the unexposed face of the wall at a moderately low temperature in order to prevent the spread of the fire. A further consideration for an acceptable fire-resistant wall is the integrity of the wall assembly against penetration by a water stream from a fire hose at the termination of the fire exposure period. Masonry walls achieve these conditions as a result of the high structural/thermal mass and large heat capacity inherent in the dense materials utilized. Lightweight wall assemblies, by contrast, require good thermal insulation in lieu of large thermal mass. The utilization of the heat of dehydration of gypsum can provide an effective cooling mechanism for a fire-resistant wall. However, as this water of hydration, which binds the gypsum material, is converted to steam, the gypsum is recalcined into a fine hemi-hydrate powder, or stucco, leaving a wall component that is devoid of structural integrity, lacking dimensional stability, and without strength after fire exposure. Moreover, the recalcined gypsum material is easily washed away with water from a fire hose. At a minimum, the wall is easily crumbled by the action of water from fire hoses because of shrinking and bending of the studs as well as from the shrinking of the gypsum itself which produces cracks therein.

Structural rigidity of gypsum wallboard, which is proportional to the moment of inertia of the paper facing sheets about the bending axis, derives from the bond of the paper to the core. This bond is affected by the degree of saturation of the paper which also promotes rehydration and crystalline growth of the gypsum into the paper. In addition, the compressive strength of the gypsum core is proportional to the density, the type of crystallization, and the degree of rehydration. Of the naturally occurring forms of gypsum, three are common. Acicular or needle-like satinspar and plate-like selenite do not have adequate structural integrity to be of interest in the construction trades, and physical conditions which promote the growth of these forms prevent the formation of structural gypsum. Massive gypsum, or alabaster, has random three-dimensional crystalline orientation, and while not highly soluble in water, it is hygroscopic and will soften when wet. During this condition, it loses most of its strength and in a wallboard structure, the gypsum/paper crystalline bond is easily destroyed or damaged. If properly dried, the core strength will return.

Care must be exercised in the selection of additives for gypsum wallboard, since a poor choice of additives may cause improper recrystallization (development of an interpenetrating network through random crystalline growth), with a resulting loss of strength both in the core and in the paper facing sheet bond. In addition, the presence of soluble salts and other impurities affects the gypsum/paper bond and the core strength detrimentally. Finally, the setting time, which is directly related to the rate of rehydration and release of heat, must be maintained within strict limits to meet operational criteria of a wallboard manufacturing process specification; that is, the mix must retain a working viscosity while in the mixer and during the wetting of the paper facing sheets, must be plastic but hold its form while passing through the forming rolls and smoothing bars, and must cure to moderate handling strength sufficient for cutting and transport to the dryer within the length of a production line which is typically 4–5 min. for a 1000 ft. line and a board movement rate of 200–250 ft./min.

Retarders are used to prevent initial setting during the first phase and accelerators are used to produce final set within the proper time period. Different compounds affect the initial set and rehydration cycle and the chemistry becomes complex and highly proprietary. The primary accelerator is the addition of freshly ground massive gypsum as a seed crystal. Without retardation, typically by using water-soluble organic acids or bases, the nucleation will proceed to rapid initial set, thereby preventing proper wetting and forming. Additional accelerators such as potash, for example, are employed to enhance the rehydration phase to produce "Vicat Set." That is, the point where the strength measured by a Vicat hardness tester is adequate for cutting and drying, at which time the rehydration exotherm has reached completion and the temperature of the material remains approximately constant.

Natural massive gypsum has a density of about 2.35 $g/cm^3$ (147 $lb/ft.^3$) which is approximately three times the density of typical fire-resistant gypsum wallboard (47 $lb/ft.^3$). Reconstitution of massive gypsum dihydrate at atmospheric pressure will not produce the high density of the natural gypsum because of the requirement of excess water to generate a workable slurry mixture. The cured density of Plaster of Paris ranges from a high of about 75 $lb/ft.^3$ with a water:stucco wet weight ratio of 0.8 to a low of 36 $lb/ft.^3$ with a corresponding ratio of 1.7. Compressive strength falls from 2000 psi to 170 psi, respectively. The exact formula specification of 1.5 moles of water added to one mole of calcium sulfate hemi-hydrate to produce the massive gypsum corresponds to a water:stucco ratio of 0.186.

Generally, the amount of available water directly determines the final cured gypsum density.

Accordingly, an object of the present invention is to provide a gypsum-based construction material having improved dimensional and structural stability when exposed to fire.

Another object of this invention is to provide a gypsum-based construction material having improved resistance to water after being exposed to fire.

Yet another object of the present invention is to provide a gypsum-based construction material derived from less expensive materials than those currently employed.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects and in accordance with the purpose of the present invention, as embodied and broadly described herein, the composition hereof includes gypsum board materials having improved fire and water resistance produced by combining a self-hardening geopolymer adhesive with a gypsum board formulation slurry, wherein the geopolymer adhesive includes a soluble alkali metal silicate solution, a pH-lowering and buffering agent, a thickening agent, and a slow-dissolving chemical setting agent, and the gypsum board slurry formulation includes stucco, water, lignin, retarder, potash, glass, fiber, starch, paper pulp, boric acid, dextrose, and soap. Soluble alkali metal silicate solution, a thickening agent, and an activator.

Benefits and advantages of the subject invention include gypsum-based materials having improved dimensional stability, structural integrity, and water resistance after exposure to fire. Additionally, in the case where the present compositions include wallboard, only slight modification to existing wallboard plants are required, and, because of the possibility of substitution of less expensive components, materials can also be produced at lower cost.

BRIEF DESCRIPTION OF THE DRAWINGS

The accompanying drawings, which are incorporated in and form a part of the specification, illustrate two embodiments of the present invention and, together with the description, serve to explain the principles of the invention. In the drawings.

Curve 2 illustrates a similar rehydration profile to that shown in curve 1 hereof for a composition including the gypsum wallboard formulation thereof with added geopolymer adhesive according to the teachings of the present invention (the formulation does not contain accelerator, retarder, or flyash materials).

Curve 3 illustrates a similar rehydration profile to that shown in curve 2 hereof, except that flyash has been added to the formulation.

Figure 2:
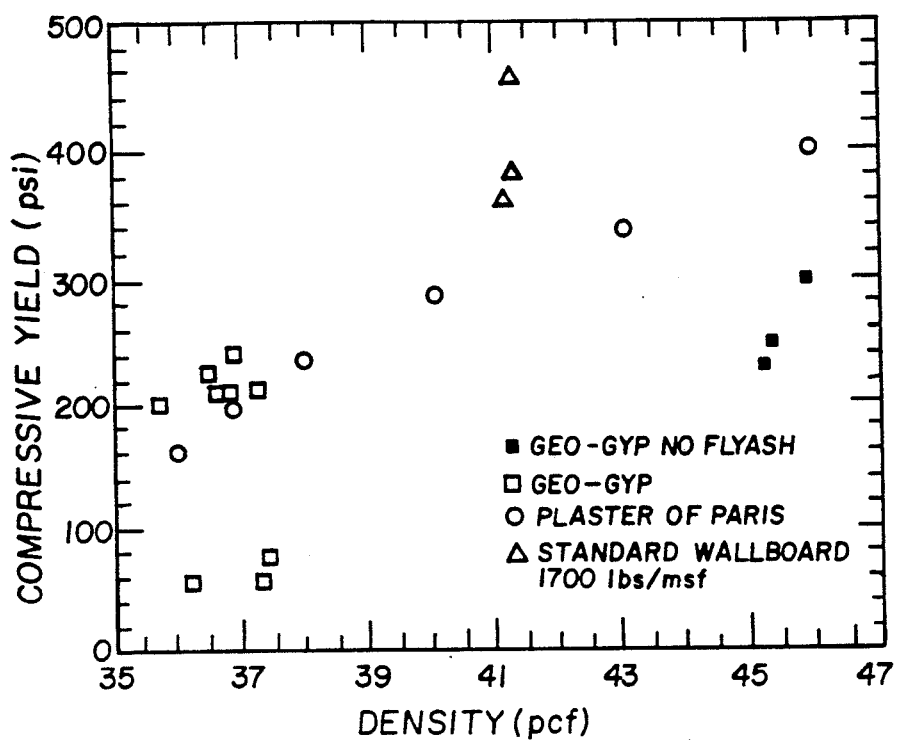

FIG. 2 illustrates the compressive yield of materials produced according to the teachings of the present invention as a function of the density thereof.

Figure 3:
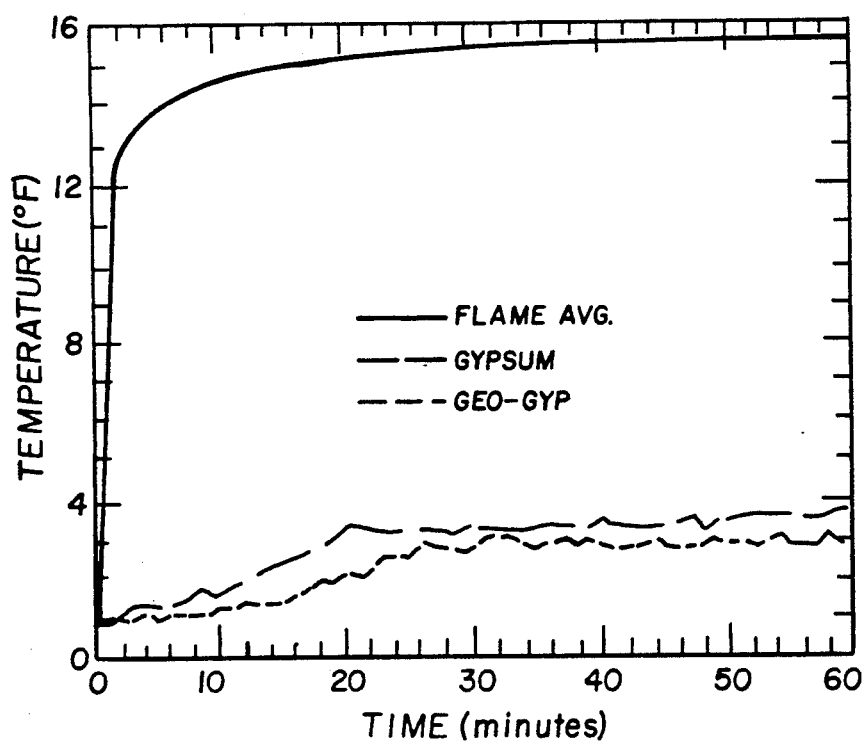

FIG. 3 illustrates a comparison fire test between conventional gypsum wallboard and wallboard produced according to the teachings of the present invention.

DETAILED DESCRIPTION OF THE INVENTION

Briefly, the present invention includes compositions that result from combining geopolymer adhesives with gypsum slurry formulations to produce interpenetrating networks (IPNs) which cure to form refractory solids by loss of process water. Geopolymer adhesive components include: soluble and insoluble silicates; buffers; salts in aqueous suspension; and chemical setting agents. The curing cycle of the geopolymer material begins with the formation of a complicated liquid or gel of cations ($Ca^{2+}$, $Zn^{2+}$, etc.) and anion complexes. The anionic constituents then polymerize, forming chains that are cross-linked by the cations. The final composition of the geopolymer IPN (in the absence of the gypsum-based materials) is a polymerized silica matrix which may incorporate dispersed-phase particles, fibers, fillers, and extenders. In addition, since there is no chemical or structural dependence on water in the resulting silica matrix, when incorporated into gypsum-based construction materials according to the teachings of the present invention, the refractory IPN provides the remaining structure to gypsum-based wallboard after such compositions are exposed to fire.

According to present understanding of the invention, the addition of geopolymer adhesives to gypsum slurries provides the following:

1. Cross-linking of the gypsum through geopolymer IPN structures; that is, a reticulated co-structure, parallel to the random crystallization of the gypsum;

2. The geopolymer IPN is not destroyed upon recalcining of the gypsum, and the structural integrity of the composite after fire exposure resists crumbling to a degree which is proportional to the amount of geopolymer adhesives employed;

3. The insoluble nature of the geopolymer IPN improves the performance of the composite matrix when exposed to water, minimizing softening, etc.; and 4. The addition of relatively inert inorganic additives to the slurry minimally affects the gypsum chemistry while providing seed nucleation sites for both gypsum and geopolymer material. Examples of such dispersed-phase inert materials are expanded perlite, vermiculite, flyash, diatomaceuos earth, etc.

A brief description of the chemistry of geopolymer adhesives, gypsum slurries, and mixtures thereof will be instructive. Geopolymer adhesives, mixed to a viscosity suitable for workability in the range of 150-200 centipoise, contain about 55% solids, not including the dispersed-phase additive (DPA) materials. These mixtures are alkaline with a pH of approximately 11.0-11.5, and further reduction of the pH without dilution produces a wide variation of gelation rates. In addition, anhydrous material which quickly absorbs water will also produce gelation by dehydration of the geopolymer adhesive, as will the introduction of soluble calcium ions. Since the rehydration reaction of gypsum proceeds in the pH range of 6-7, modest quantities of gypsum slurry added to the geopolymer adhesive will cause rapid gelation and setting of the geopolymer. These reactions proceed so quickly that adequate mixing is generally precluded, and attempts to buffer the pH of gypsum to the range of 11.0–11.5, thereby preventing gelation by pH depression, are countered by the presence of adequate calcium attached to the sulfate radical. Therefore, a composite material comprising geopolymer adhesive with minor amounts of gypsum as an additive is not a viable material for wallboard production because rapid setting of the mixture precludes proper blending and mixing.

The alternative approach, which overcomes the above-identified difficulties, is to use geopolymer adhesives as a minor constituent additives to the gypsum slurry. This technique has been found to:

1. eliminate premature setting of the gypsum and provide adequate time for paper wetting and board forming;
2. permit the addition of dispersed-phase additives such as flyash to increase the density of the resulting compositions to the desired level, thereby providing improved bulk material strength and improved bonding to paper facing sheets;
3. reduce the amounts of relatively expensive potash accelerator used in conventional gypsum-based wallboard slurries to decrease the reaction time for stucco rehydration;
4. provide adequate bonding to standard gypsum wallboard paper facing sheets and other exterior laminating media; e.g., polyester fabric, fiberglass mat, etc.;
5. improve fire performance of the resulting material by incorporating the desirable characteristics of gypsum, while reducing shrinkage and warpage, eliminating crack formation, and enhancing structural integrity after recalcination of the gypsum; and
6. improve resistance to softening in the presence of water as is characteristic of ordinary gypsum-based wallboard.

Having generally described the present invention, the following specific examples are given as a further illustration thereof.

EXAMPLE I

Although exact industrial formulations for gypsum-based wallboard material are proprietary, the major components thereof include starch, pulp paper, lignin, potash, glass fiber, stucco, massive gypsum, water, soap, boric acid, dextrose, and retarder in addition to the paper facing, trim tape, etc. In a laboratory demonstration of the present invention, the geopolymer adhesive is formulated as a Wet Mix Additive (WMA) and a Dry Mix Additive (DMA). The WMA includes a suspension of non-expanding aluminum silicate clay or other suitable silicate material, as a thickener, in an aqueous solution of an alkali metal silicate, buffered by a Lewis acid salt. The DMA includes finely divided sodium silicofluoride or zinc oxide and calcium metasilicate. The sodium fluorosilicate is a slowly-dissolving, pH-lowering and buffering chemical setting agent, the zinc oxide is also a slowly-dissolving chemical setting agent, and the wollastonite form of calcium metasilicate is added to control shrinkage and promote long-term strength of the geopolymer IPN. Flyash is preferable as the thickener material because of its lower cost, but kaolinite, halloysite, illite, and attapulgite or other thickeners such as wollastonite and kaolin may be used. Kaolin includes the hydrous aluminum silicate clay mineral group of materials. The sodium silicate solution, generally expressed by the formula $Na_2O \cdot SiO_2$, and also known as water glass (in concentrated solution) or sodium metasilicate, consists of about 61% by weight of water, the dissolved solids including alkali, represented by $Na_2O$, and silicate, represented by $SiO_2$, the silicate to alkali weight ratio ranging between 1.7 and 4.5, with a preferred ratio of approximately 3.2. Solutions of sodium silicate useful in the practice of the present invention include between 30 and 40 weight percent of solids (approximately 34° Baume density), and preferably, 35–39 weight percent (39° Baume). Potassium or lithium silicate may be substituted for the sodium silicate in some situations. Lewis acid materials can be $MgCl_2$ or $CaCl_2$, or a mixture thereof, in the range between 0 and 0.4 weight percent; however, $MgCl_2$ is preferred. A summary of the useful geopolymer adhesive composition ranges is found in Table I.

TABLE I

| Material | Weight % (min.) | Weight % (max.) |
|---|---|---|
| wollastonite | 5.2 | 23.6 |
| sodium silicofluoride | 0.0 | 15.7 |
| zinc oxide | 1.3 | 5.2 |
| sodium silicate | 43.0 | 65.0 |
| alkaline earth chloride | 0.0 | 0.4 |
| water | 11.0 | 16.0 |
| Kaolin | 0.0 | 16.0 |
| flyash | 0.0 | 16.0 |

The first two materials comprise the DMA, while the second five comprise the WMA. The zinc oxide may be used as a replacement setting agent for the sodium silicofluoride. Finely divided particles of zinc oxide also function as a retarder in the gypsum wallboard formulation.

First, the alkaline earth metal chloride salt is dissolved in water. Aluminum silicate clay or other suitable silicate material is mixed with sodium silicate solution, and after thorough blending, the metal chloride salt solution is added. The density of the WMA is typically about 1.4 g/cc, and as stated above, the DMA is typically a dry blend of finely screened sodium fluorosilicate or zinc oxide and calcium metasilicate, each of which are relatively insoluble. Flyash, which is high in alumino-silicates, has a large surface area and serves as a nucleation site and density modifier, is added to the mixture.

Typical ranges for the geopolymer-modified gypsum wallboard formulation are set forth in wet weight percent in Table II.

TABLE II

| Components | Weight % |
|---|---|
| stucco | 34.56 – 54.14 |
| water | 24.43 – 38.28 |
| ball mill accelerator | 0.09 – 0.14 |
| starch | 0.36 – 0.56 |
| pulp paper | 0.27 – 0.43 |
| lignin | 0.11 – 0.18 |
| soap | 0.005 – 0.01 |
| potash | 0.001 – 0.002 |
| glass fiber | 0.11 – 0.16 |
| WMA | 3.70 – 14.80 |
| DNA | 1.30 – 5.20 |
| flyash | 1.00 – 20.00 |

The first two components listed constitute the basic gypsum slurry formulation for gypsum wallboard material, while the next seven materials in various combinations and with additional small amounts of other materials (the exact formulations quantities and identities being proprietary with the wallboard manufacturers) constitute less than one percent of the initial composition. The WMA and DMA constitute the geopolymer adhesive and are added according to the teachings of the present invention. The addition of flyash to the composition as a dispersed-phase additive is desirable since it is quite inexpensive and improves the quality of the final product.

The dry ingredients of Table II are blended. These ingredients include starch, stucco, potash, flyash, and one-half of the glass fiber bulk. One-half of the water, the lignin, and the paper pulp, along with the remaining one-half of the glass fibers are well mixed and dispersed. The DMA is added to this suspension and the entire mixture is blended. The temperature of the mixture is adjusted to about 100° F. by the addition of hot water. The WMA is then added and the mixture is blended. The resulting warm, wet mixture is transferred to another mixing container where the dry mixture is added. The remaining water is also added at this time. All of the components are mixed for a period not to exceed fifteen seconds and transferred to paper-lined forming molds.

Reference will now be made in detail to the present preferred embodiments of the invention, examples of which are illustrated in the accompanying drawings. Turning now to the drawings, FIG. 1, curve 1 illustrates the temperature dependence versus time for a typical setting/cure of a gypsum wallboard formulation. The rehydration is essentially complete by about six minutes. This is evidenced by the flattening of the temperature profile in that the mixture is no longer generating additional heat. At this time, the board is sufficiently strong to handle and cut.

Figure 1:
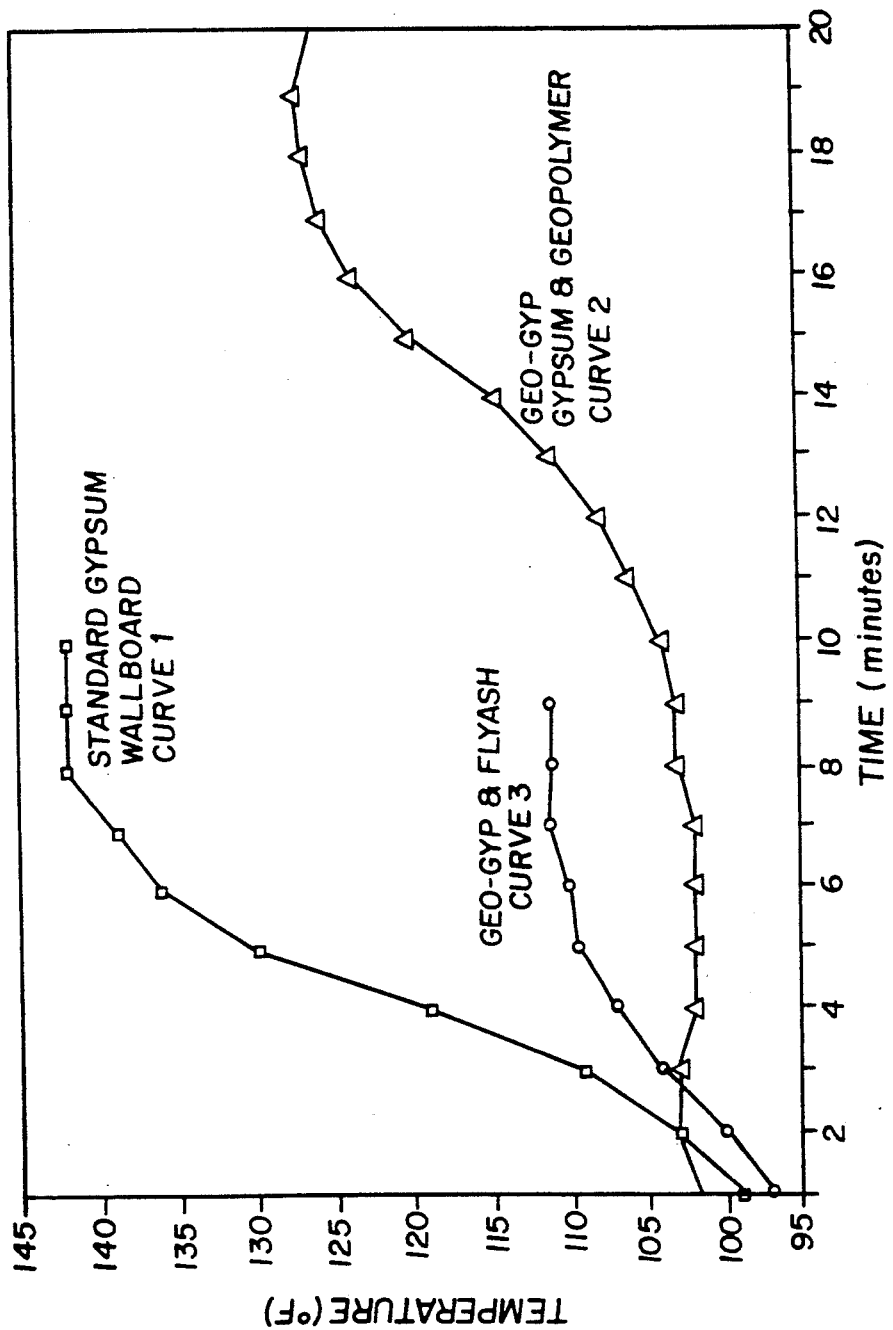
FIG. 1, curve 1 illustrates a typical setting-temperature versus time rehydration for conventional gypsum wallboard formulations.

FIG. 1, curve 2 illustrates a similar rehydration profile in the laboratory environment for a mixture of gypsum wallboard materials and geopolymer adhesive according to the teachings of the present invention, except that the flyash has been omitted. The onset of initial setting is seen to be delayed about ten minutes as opposed to that of FIG. 1, curve 1 hereof, and final temperature achieved by the mixture is reduced, as a result of the larger thermal mass of the formulation.

FIG. 1, curve 3 shows a similar profile to that illustrated in FIG. 1, curve 2 hereof, except that flyash has now been included in the formulation. The set time has decreased by half. The temperature rise is smaller due to the increased mass of the added flyash.

As has been stated hereinabove, the strength of gypsum wallboard compositions is directly related to the density of the final material. This density is in turn related to the amount of water used during the mixing process. FIG. 2 shows the measured values of compressive yield strength versus density for a variety of samples prepared according to the teachings of the present invention with final densities ranging from 35 to 46 pcf (open boxes). Six strength versus density measurements for typical gypsum formulations are plotted in FIG. 2 as circles for comparision. These are reproduced from *CRC Practical Handbook of Materials Science*, Table 5.4-11, page 275 thereof from data of Barron and Laroque. Most of the measurements for the compositions of the present invention fall in the density range between 35 and 58 pcf plotted as open squares on the figure. The three data points indicated by triangles having about 41 pcf density were control formulations of standard gypsum wallboard material at 1700 lbs/msf, while the three black square data points at about 46 pcf were vermiculite-doped gypsum/geopolymer formulations where flyash was omitted. This illustrates that adequate density can be achieved with proper selection of additives in the formulations of the present invention.

FIG. 3 shows a comparison of the exposure of a ½-inch gypsum wallboard and a ½-inch wallboard fabricated according to the teachings of the present invention having identical paper facing sheets to a direct flame. The board material in each case was horizontally oriented about 1.5 inches above a propane-fired Meeker gas burner for one hour. Measurement thermocouples were placed in contact with the face exposed to the flame, and on the unexposed face. The conventional gypsum board was fully recalcined, cracked, warped, and structurally weakened after the firing period, while the board prepared according to the teachings of the present invention not only exhibited excellent dimensional stability; that is, minimal shrinkage, warpage, and cracking, but also maintained good structural integrity.

It has therefore been found that under laboratory conditions, addition of 5-20% by weight of geopolymer adhesive to conventional gypsum wallboard formulations and the further addition of 5-18% by weight of flyash as a DPA is successful in producing wallboard having desired characteristics. In the concentrations investigated, the geopolymer acts as a dilute impurity and does not upset the crystal growth of the gypsum and attendant attachment of the core material to facing sheet materials.

The following examples illustrate the application of the teachings of the present invention in a conventional gypsum wallboard plant. The ordinary gypsum slurry flow rate in the plant employed was 2124 lbs/min. After reducing the gypsum flow rate, the geopolymer adhesive was added as three separate components: sodium silicate solution, water, and DMBL, a blend of DMA and the solid components of WMA, in amounts such that the final flow rate was again 2124 lbs/min.. All materials were added to the gypsum slurry through a high-shear pin mixer which achieved uniform mixing within 2 seconds. The resulting geopolymer-modified gypsum wallboard material was processed according to ordinary plant procedures. In some experiments, additional flyash was added to improve the resulting wallboard product and reduce overall materials costs.

EXAMPLE II

A.1. 95% gypsum slurry and 5% geopolymer adhesive

The gypsum flow rate was reduced to 2017.8 lbs/min. in order to add 106.2 lbs/min. of geopolymer adhesive as 57.0 lbs./min. of sodium silicate solution, 14.4 lbs./min. of extra water, and 34.8 lbs./min. of DMBL.

A.2 95% of (95% gypsum slurry and 5% geopolymer adhesive) plus 5% of flyash

Along with the addition of the materials as described in A.1., 5% of flyash was added as follows:

The gypsum flow rate was reduced to 1960.9 lbs/min., and 54.1 lbs/min. of sodium silicate solution, 13.7 lbs/min. of extra water, 33.1 lbs/min. of DMBL, and 106.2 lbs/min. of flyash were added.

A.3 90% of (95% gypsum slurry and 5% geopolymer adhesive) plus 10% of flyash

Along with the addition of the materials as described in A.1., 10% of flyash was added as follows:

The gypsum flow rate was reduced to 1816.0 lbs/min., and 51.3 lbs/min. of sodium silicate solution, 13.0 lbs/min. of extra water, 31.3 lbs/min. of DMBL, and 212.4 lbs/min. of flyash were added.

B.1. 90% gypsum slurry and 10% geopolymer adhesive

The gypsum flow rate was reduced to 1911.6 lbs/min. in order to add 114,.0 lbs/min. of sodium silicate solution, 28.8 lbs./min. of extra water, and 69.7 lbs/min. DMBL.

B.2 95% of (90% gypsum slurry and 10% geopolymer adhesive) plus 5% of flyash

Along with the addition of the materials as described in B.1., 5% of flyash was added as follows:
The gypsum flow rate was reduced to 1816.0 lbs/min., and 108.3 lbs/min. of sodium silicate solution, 27.4 lbs/min. of extra water, 66.2 lbs/min. of DMBL, and 106.2 lbs/min. of flyash were added.

B.3 90% of (90% gypsum slurry and 10% geopolymer adhesive) plus 10% of flyash

Along with the addition of the materials as described in B.1., 10% of flyash was added as follows:
The gypsum flow rate was reduced to 1720.4 lbs/min., and 102.6 lbs/min. of sodium silicate solution, 25.9 lbs/min. of extra water, 62.7 lbs/min. of DMBL, and 212.4 lbs/min. of flyash were added.

Tests on the resulting wallboard demonstrated that the addition of geopolymer adhesive and flyash to standard gypsum slurry in a wallboard plant environment produced superior quality wallboard materials having similar characteristics to that produced in the laboratory demonstration of Example I.

The foregoing description of several preferred embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What I claim is:

1. Gypsum wallboard materials having improved fire and water resistance produced from combining a self-hardening mixture comprising a geopolymer adhesive with a gypsum wallboard slurry, wherein said geopolymer adhesive comprises 43%–65% of soluble alkali metal silicate solution, 0.0%–0.4% of a pH-lowering and buffering agent, 1.3%–15.7% of a chemical setting agent for said soluble alkali metal silicate, 5.2%–23.6% of a strengthening agent, 11%–16% water, and 0.0%–16% of a thickening agent.

2. The gypsum wallboard materials as described in claim 1, wherein said strengthening agent includes calcium metasilicate.

3. The gypsum wallboard materials as described in claim 2, wherein the wollastonite form of said calcium metasilicate is used.

4. The gypsum wallboard materials as described in claim 1, wherein said soluble alkali metal silicate is selected from the group consisting of sodium silicate, potassium silicate and lithium silicate.

5. The gypsum wallboard materials as described in claim 1, wherein said thickening agent includes hydrous aluminum silicate clay.

6. The gypsum wallboard materials as described in claim 1, wherein said chemical setting agent includes sodium fluorosilicate.

7. The gypsum wallboard materials as described in claim 1, wherein said chemical setting agent includes zinc oxide.

8. The gypsum wallboard materials as described in claim 1, wherein a sufficient amount of said geopolymer adhesive is present to form an interpenetrating network which bonds, supports, and provides improved fire and water resistance to said gypsum board formulation.

9. The gypsum board materials as described in claim 1, wherein said pH-lowering and buffering agent includes at least one Lewis acid.

10. The gypsum wallboard materials as described in claim 1, wherein said pH-lowering and buffering agent is selected from the group consisting of calcium chloride, magnesium chloride, and mixtures thereof.

11. The gypsum wallboard materials as described in claim 1, wherein said thickening agent includes flyash.

12. Gypsum wallboard materials having improved fire and water resistance produced from combining a self-hardening mixture comprising commercially-utilized gypsum wallboard slurry and a geopolymer adhesive, said geopolymer adhesive comprising 43.0%–65.0% of soluble alkali metal silicate solution, 0.0%–16% of a thickening agent, 5.2%–23.6% of a strengthening agent, 11%–16% water, and 1.3%–15.7% of a chemical setting agent for said soluble alkali metal silicate solution.

13. The gypsum wallboard materials as described in claim 12, wherein said thickening agent comprises wollastonite, kaolin, and flyash.

14. The gypsum wallboard materials as described in claim 12, wherein said chemical setting agent comprises sodium fluorosilicate.

15. The gypsum wallboard materials as described in claim 12, wherein said chemical setting agent comprises zinc oxide.

16. The gypsum wallboard materials as described in claim 12, wherein said geopolymer adhesive comprises between 5% and 20% by wet weight of said gypsum wallboard slurry.

17. The gypsum wallboard materials as described in claim 13, wherein said flyash comprises between 5% and 18% of the mixture of said gypsum wallboard slurry and said geopolymer adhesive.

18. A method for producing gypsum wallboard materials having improved fire and water resistance, said method comprising the steps of:
   a. combining a self-hardening mixture comprising commercially-utilized gypsum wallboard slurry with a geopolymer adhesive, said geopolymer adhesive comprising 43%–65% of soluble alkali metal silicate solution, 0.0%–16% of a thickening agent, 5.2%–23.6% of a strengthening agent, 11%–16% water, and 1.3%–15.7% of a chemical setting agent for said alkali metal silicate solution; and
   b. permitting the mixture resulting therefrom to harden.

19. The method as described in claim 18, wherein the thickening agent comprises wollastonite, kaolin, and flyash.

20. The method as described in claim 18, wherein the chemical setting agent comprises sodium fluorosilicate.

21. The method as described in claim 18, wherein the chemical setting agent comprises zinc oxide.

22. The method as described in claim 18, wherein the geopolymer adhesive comprises between 5% and 20% by wet weight of the gypsum wallboard slurry.

23. The method as described in claim 19, wherein the flyash comprises between 5% and 18% of the mixture of the gypsum wallboard slurry and the geopolymer adhesive.

24. The method as described in claim 18, further comprising the step of heating the hardened mixture to remove excess water.

* * * * *